US 9,329,470 B2

United States Patent
Huang

(10) Patent No.: US 9,329,470 B2
(45) Date of Patent: May 3, 2016

(54) DISPLAY APPARATUS FOR DISPLAYING MULTIPLE VIEW ANGLE IMAGES

(75) Inventor: June-Jei Huang, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 239 days.

(21) Appl. No.: 13/108,051

(22) Filed: May 16, 2011

(65) Prior Publication Data
US 2011/0285968 A1 Nov. 24, 2011

(30) Foreign Application Priority Data
May 18, 2010 (TW) .............................. 99115775 A

(51) Int. Cl.
| | |
|---|---|
| *G02B 27/22* | (2006.01) |
| *H04N 13/04* | (2006.01) |
| *G03B 35/24* | (2006.01) |
| *H04N 9/31* | (2006.01) |

(52) U.S. Cl.
CPC .............. *G03B 35/24* (2013.01); *G02B 27/225* (2013.01); *G02B 27/2214* (2013.01); *H04N 9/3111* (2013.01); *H04N 9/3147* (2013.01); *H04N 13/0402* (2013.01); *H04N 13/0404* (2013.01); *H04N 13/045* (2013.01); *H04N 13/0406* (2013.01); *H04N 13/0415* (2013.01); *H04N 13/0445* (2013.01); *H04N 13/0447* (2013.01); *H04N 13/0459* (2013.01)

(58) Field of Classification Search
CPC .......... H04N 13/0445; H04N 13/0447; H04N 13/045; H04N 13/0402; H04N 13/0404; H04N 13/0406; H04N 13/0415; H04N 9/3147; G02B 27/2214; G02B 27/225
USPC ..................... 353/7, 8; 348/42, 51, 52, 54, 59
See application file for complete search history.

(56) References Cited

U.S. PATENT DOCUMENTS

| | | | | |
|---|---|---|---|---|
| 3,814,513 A | * | 6/1974 | Nims ..................... | G03B 35/24 353/7 |
| 5,430,474 A | * | 7/1995 | Hines ............................... | 348/42 |
| 5,614,941 A | * | 3/1997 | Hines ............................... | 348/42 |
| 5,855,425 A | * | 1/1999 | Hamagishi ......... | G02B 27/2214 348/E13.029 |

(Continued)

FOREIGN PATENT DOCUMENTS

| | | |
|---|---|---|
| CN | 101347002 | 1/2009 |
| CN | 101460895 | 6/2009 |

(Continued)

OTHER PUBLICATIONS

Office Action from corresponding Chinese Appln. No. 2010101927469 dated Nov. 5, 2012.

(Continued)

*Primary Examiner* — Bao-Luan Le
(74) *Attorney, Agent, or Firm* — Grossman, Tucker, Perreault & Pfleger, PLLC

(57) ABSTRACT

The display apparatus comprises a display screen and a plurality of projectors. Each of the projectors comprises at least a light source module, a spatial light modulator and a lens. The first view angle image and second view angle image emitted from each projector are guided to a first sub-viewing zone and a second sub-viewing zone via a first light beam and second light beam, respectively. The sub-viewing zones imaged by each projector are adjacent to each other along a transverse axis sequentially.

8 Claims, 10 Drawing Sheets

(56) References Cited

U.S. PATENT DOCUMENTS

| | | | |
|---|---|---|---|
| 6,201,565 B1 * | 3/2001 | Balogh | 348/40 |
| 6,999,071 B2 * | 2/2006 | Balogh | 345/419 |
| 7,084,841 B2 * | 8/2006 | Balogh | 345/87 |
| 7,150,531 B2 * | 12/2006 | Toeppen | 353/7 |
| 7,425,070 B2 * | 9/2008 | Hsu | 353/7 |
| 7,648,243 B2 * | 1/2010 | Shestak | G02B 27/2214 353/10 |
| 7,959,294 B2 * | 6/2011 | Balogh | G02B 27/2214 348/59 |
| 8,011,786 B2 * | 9/2011 | Hentschke | 353/7 |
| 2003/0011884 A1 | 1/2003 | Van Berkel | |
| 2003/0058209 A1 * | 3/2003 | Balogh | 345/87 |
| 2003/0156077 A1 * | 8/2003 | Balogh | 345/6 |
| 2005/0046795 A1 * | 3/2005 | Toeppen | 353/7 |
| 2005/0270645 A1 * | 12/2005 | Cossairt | G02B 27/0087 359/463 |
| 2006/0114423 A1 * | 6/2006 | Maeda | H04N 9/315 353/94 |
| 2006/0170869 A1 * | 8/2006 | Shestak | G02B 27/2214 352/57 |
| 2008/0088921 A1 | 4/2008 | Yonekubo et al. | |
| 2008/0204663 A1 * | 8/2008 | Balogh | G02B 27/2214 353/10 |

FOREIGN PATENT DOCUMENTS

| | | |
|---|---|---|
| EP | 1 209 508 | 5/2002 |
| TW | 320808 | 11/1997 |
| TW | 329503 | 4/1998 |
| TW | 556138 | 10/2003 |
| TW | 200817823 | 4/2008 |
| TW | M372594 | 1/2010 |

OTHER PUBLICATIONS

Office Action from corresponding Chinese Appln. No. 2010101927469 dated Mar. 29, 2013.

Office Action from corresponding Chinese Appln. No. 201010192746.9 dated Jul. 30, 2013.

Office Action from corresponding Taiwanese Appln. No. 099115775 dated Jun. 3, 2013.

* cited by examiner

DISPLAY APPARATUS FOR DISPLAYING MULTIPLE VIEW ANGLE IMAGES

This application claims priority to Taiwan Patent Application No. 099115775 filed on May 18, 2010, the disclosures of which are incorporated by reference herein in their entirety.

CROSS-REFERENCES TO RELATED APPLICATIONS

Not applicable.

BACKGROUND OF THE INVENTION

1. Field of the Invention

The present invention provides a display apparatus for displaying multiple images of multiple view angles. More particularly, the present invention provides a display apparatus with a light emitting diode (LED) based projector array, which can auto-stereoscopically display multiple view angle images by using a combination of both a spatial multiplex method and a time multiplex method.

2. Descriptions of the Related Art

Over recent years, stereoscopic display technology, subsequent to flat-panel display technologies, has become one of the most important technologies that are under development. Nowadays, many three-dimensional (3D) stereoscopic displays that have been disclosed can already be utilized without wearing special glasses. The principle is to divide the visual space into a plurality of vertical viewing zones and send two stereoscopic images to the eyes of the user. Then, according to the visual characteristics of human eyes, the user can experience the gradation and depth of field that results in the perception of a 3D image when the eyes of the user receive two images with the same image content but different parallaxes.

FIG. 1 is a schematic view of a conventional projection-type stereoscopic display apparatus 1 using spatial multiplex method. As shown in FIG. 1, the conventional projection-type stereoscopic display apparatus 1 using the spatial multiplex method comprises a plurality of light sources 11, a plurality of collimating lenses 13, a plurality of converging lenses 14, a liquid crystal panel 15, a double lenticular lens 17, which comprises two back-to-back lenticular lens sheets, and a scatter plate 19. Firstly, the light generated by the light sources 11 is made into collimated light rays via the collimating lenses 13, then an image is displayed by the liquid crystal panel 15, converged by the converging lenses 14, and projected onto the double lenticular lens 17. Herein, two sides of the scatter plate 19 respectively adjoin the double lenticular lens 17 so that the image can be scattered and projected onto the viewing zones.

Additionally, because one projector lens only corresponds to a view angle, the amount of view angles is limited by the space arrangement of the projection apparatus, so that the number of view angles of the aforesaid conventional stereoscopic image display technology is limited.

FIG. 2 is a schematic view of a conventional projection-type stereoscopic image display apparatus 2 using time multiplex method. As shown in FIG. 2, the stereoscopic display apparatus 2 comprises a light source 21, a polarizer 23, a rotary polygonal mirror 25, a liquid crystal panel 27 and a number of optical components 29. The light beam generated by the light source 21 is polarized by the polarizer 23, and then the polarized light beam is reflected by the rotary polygonal mirror 25 for scanning An image is displayed by the liquid crystal panel 27 and projected onto a viewing zone by the optical components 29. The aperture of the lens is divided into vertical lines. Corresponding to the scanning of the light source, the lines of light source are scanning Different lines are guided into different view zones. However, the reliability of this type of the stereoscopic display apparatus 2 is poor due to the mechanical rotation of the rotary polygonal mirror 25, which results in high frictional noises and has constrained rotational speed.

According to the above descriptions, the aforesaid technologies in the prior art, no matter using the spatial multiplex method or using the time multiplex method for displaying the stereoscopic images, have shortcomings to be overcome. In view of this, a stereoscopic image display apparatus featuring a simple manufacturing process, high color saturation and a preferable resolution is an important issue in the display industry.

SUMMARY OF THE INVENTION

To solve the aforesaid problems, the objective of the present invention is to provide a display apparatus for displaying images with multiple view angles, which can demonstrate a stereoscopic performance of displaying multiple view angle images by combining the advantages of the spatial multiplex method and the time multiplex method.

To achieve the aforesaid objective, the present invention provides a display apparatus for displaying multiple view angle images. The display apparatus comprises a display screen and a plurality of projectors. Each of the projectors comprises at least a light source module, a spatial light modulator and a lens. Each of the light source module has a first LED light source and a second LED light source. The first LED light source provides a first light beam according to the first time sequence; the second LED light source is adjacent to the first LED light source and provides a second light beam according to the second time sequence; the spatial light modulator transforms the first light beam and the second light beam into a first view angle image and a second view angle image respectively; and the lens projects the first and the second view angle images to the display screen. Light from the first view angle image and light from the second view angle image projected from each of the projectors are guided to the first sub-viewing zone and the second sub-viewing zone by the display screen via the first light beam and the second light beam respectively, and the sub-viewing zones imaged by each of the projectors are adjacent to each other along the horizontal axis sequentially.

With the aforesaid arrangement of the present invention, the display apparatus can combine the advantages of both the spatial multiplex method and the time multiplex method to demonstrate a stereoscopic performance of displaying the images with multiple view angles and to significantly improve the visual luminance of the display panel. Furthermore, the use of the LED light sources not only significantly decreases the volume and power consumption of the projectors, but also improves the resolution, service life and stability of the projectors.

Thereby, a satisfactory stereoscopic displaying effect can be presented to the user's eyes directly. Thus, the problem with the prior art is effectively solved.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the display apparatus of the present invention will be explained with reference to embodiments thereof. However, these embodiments are not intended to limit the present invention to any specific environment, applications or particular implementations described in these embodiments. Therefore, the description of these embodiments is only for the purpose of illustration rather than limitation of the present invention.

Figure 1:
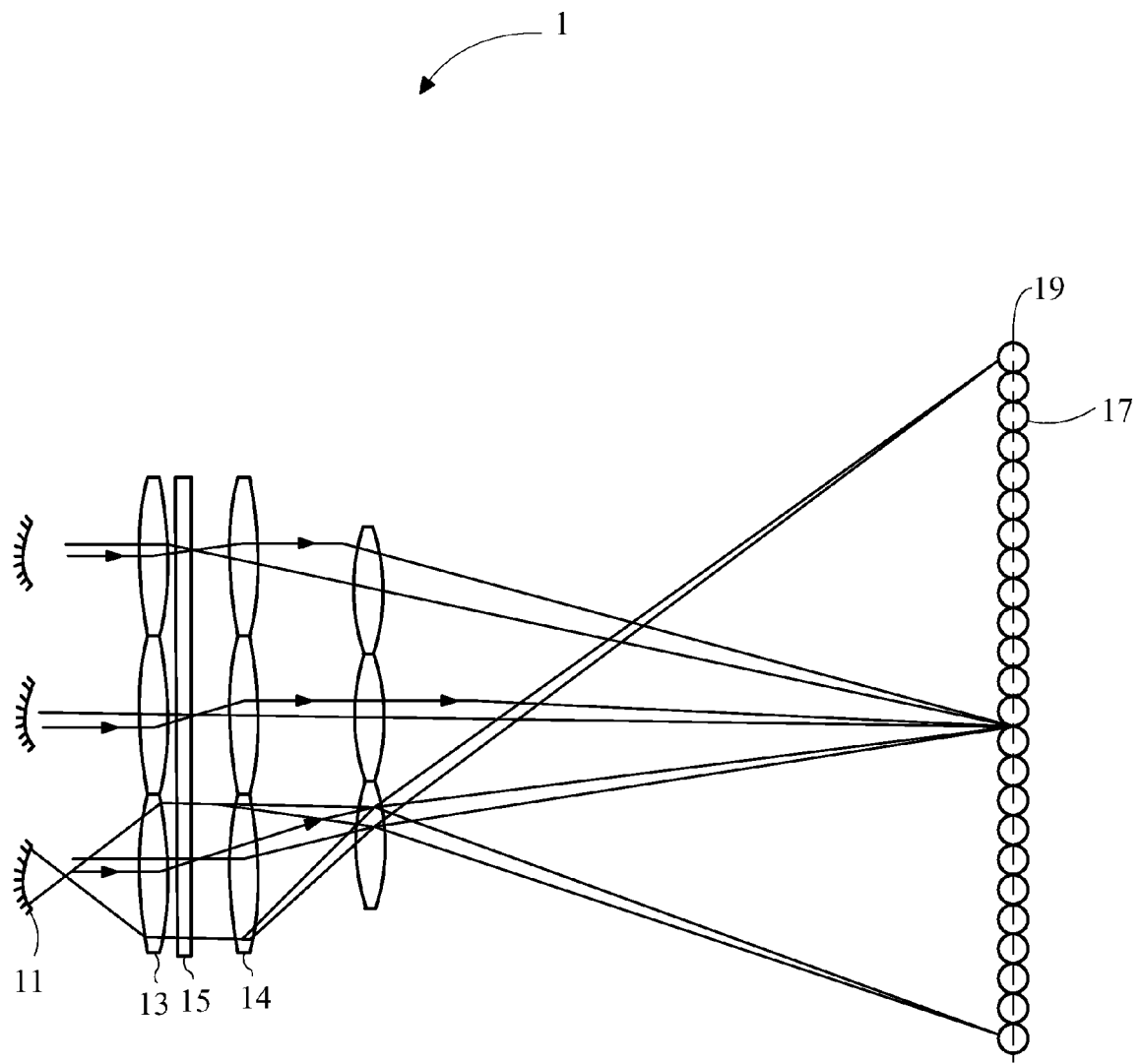
FIG. 1 is a schematic view of a conventional display apparatus using spatial multiplex method.
Figure 2:
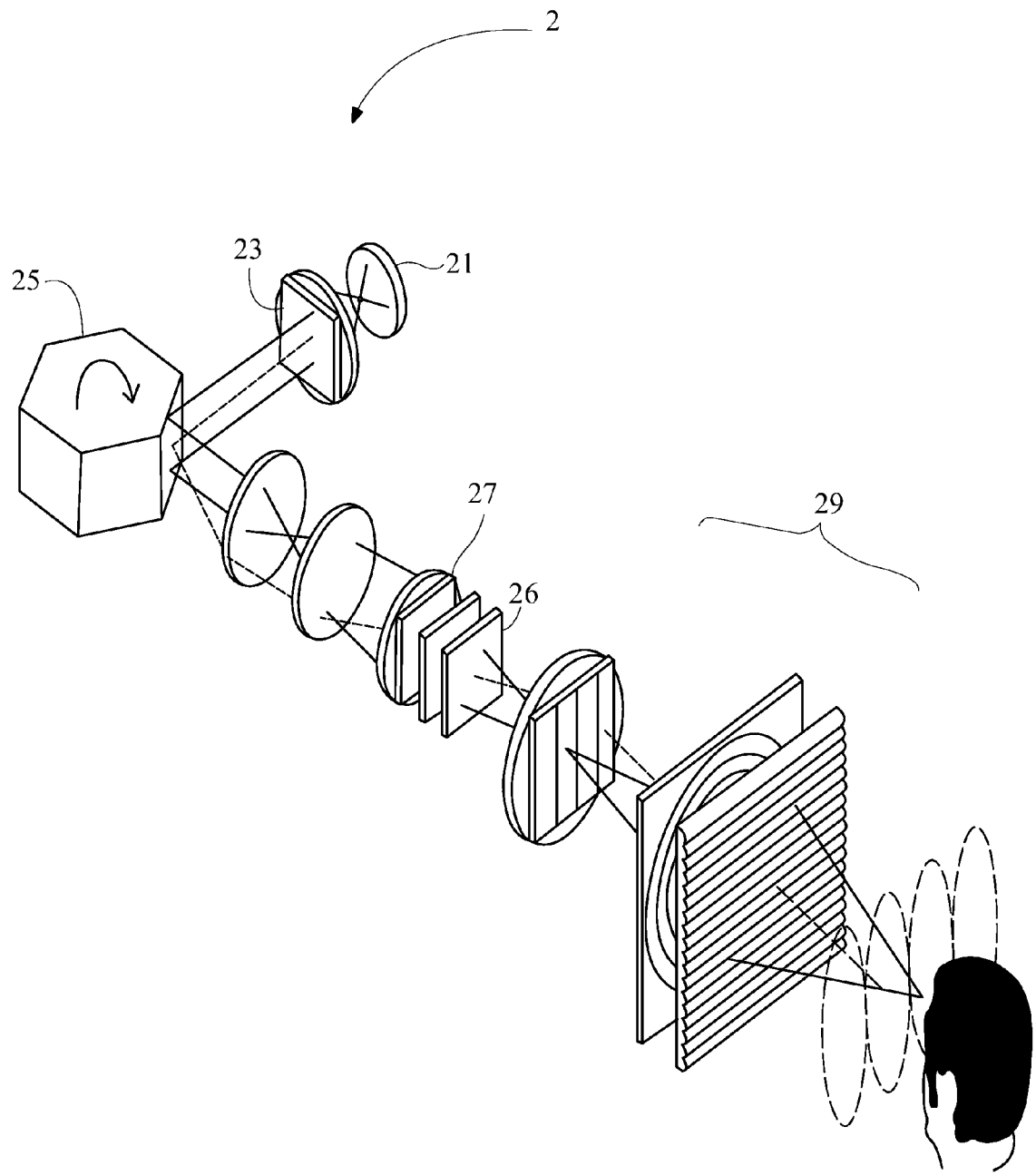
FIG. 2 is a schematic view of a conventional display apparatus using time multiplex method.
Figure 3:
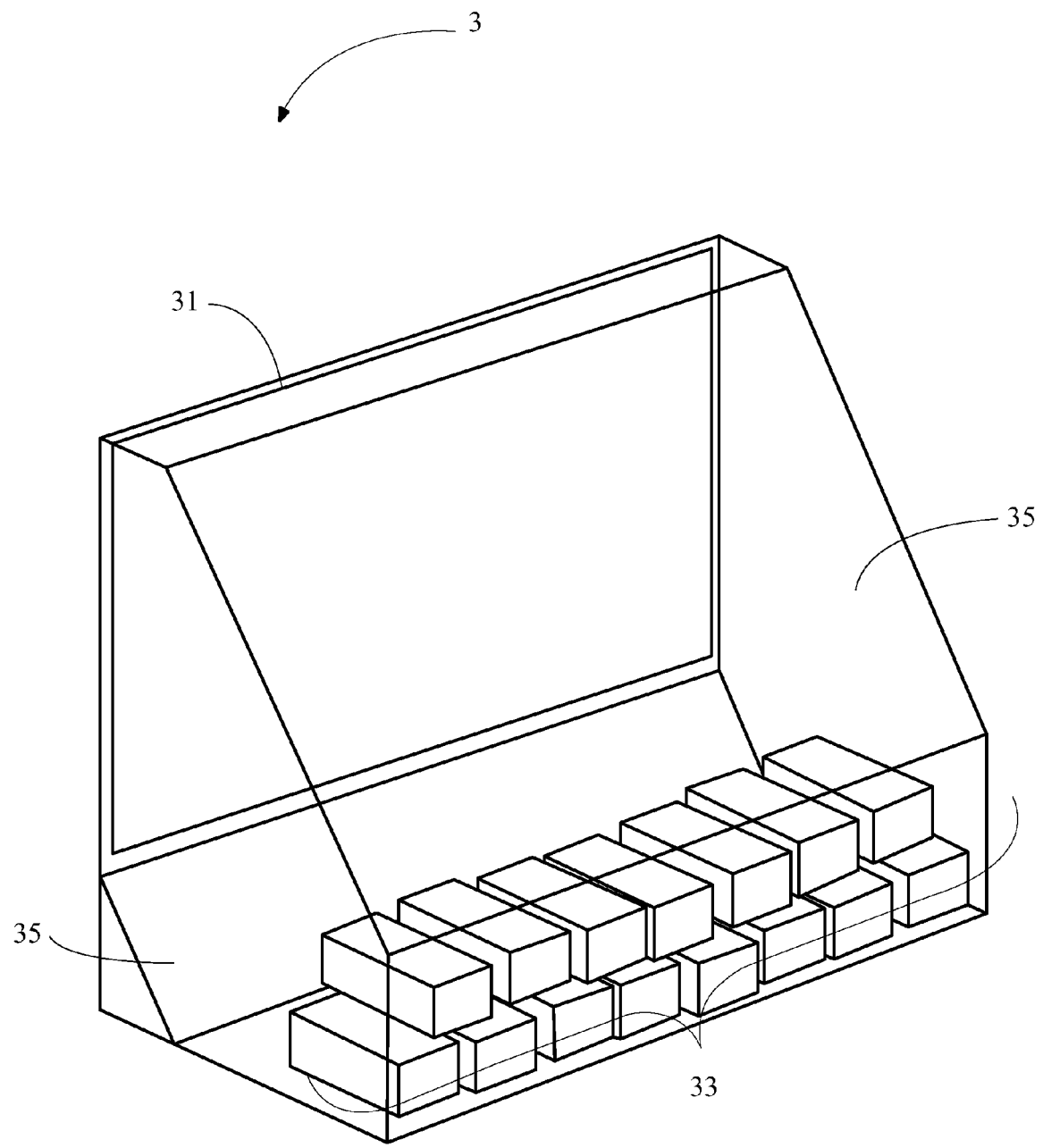
FIG. 3 is a perspective view illustrating architecture of an auto-stereoscopic display according to the first embodiment of the present invention.

First, FIG. 3 illustrates a perspective view of the architecture of a display apparatus 3 according to the first embodiment of the present invention. The display apparatus 3 comprises a display screen 31, a plurality of projectors 33 and two flat mirrors 35 for reflecting light beams. The projectors 33 are disposed with respect to the display screen 31 and formed an array in the horizontal direction. In this embodiment, the array of the projectors 33 has two rows in the vertical direction, and the projectors 33 are arranged alternately in the two rows to ensure that the external pupils of the lenses of the projectors 33 adjoin to completely cover the viewing zone. In this embodiment, fifteen projectors 33 are used; however, this number is only provided for illustration, and the examples in which the different numbers of projectors 33 are used will readily occur to those skilled in the art.

To describe the details of the display apparatus 3 according to the present invention more clearly, reference will be made to FIGS. 4 to 6 in the following description.

Figure 4:
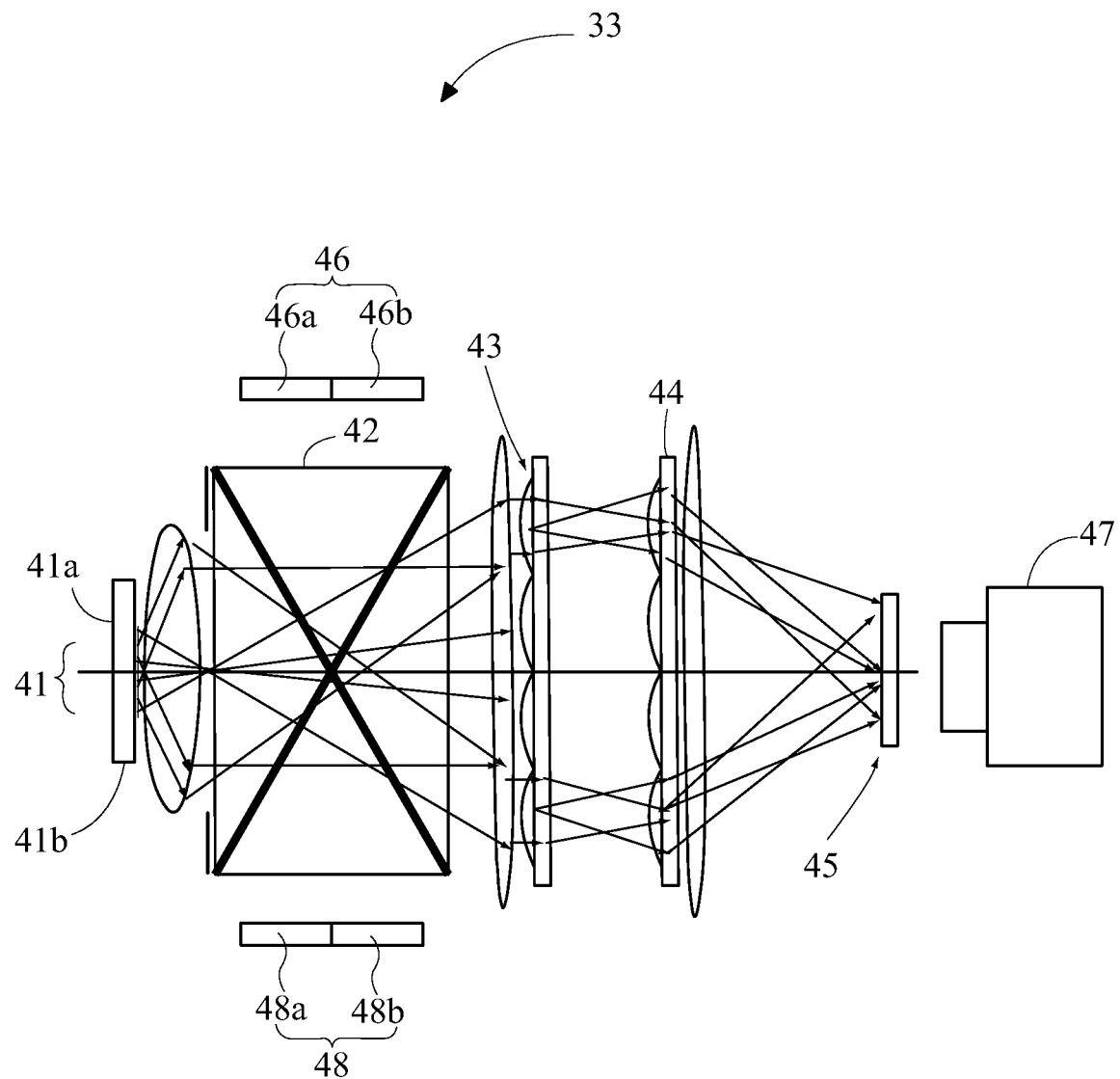
FIG. 4 is a schematic view illustrating a structure of a projector according to the first embodiment of the present invention.

FIG. 4 is a schematic view illustrating the internal components of the projector 33 according to the first embodiment of the present invention. As can be seen, the projector 33 of the first embodiment mainly comprises three light source modules, a color combining element 42, a first lens array set 43, a second lens array set 44, a spatial light modulating element 45 and a lens 47. The three light source modules comprises a first light source module 41, a second light source module 46 and a third light source module 48. The first light source module 41 comprises a first light emitting diode (LED) light source 41a and a second LED light source 41b adjacent to the first LED light source 41a; the second light source module 46 comprises a first LED light source 46a and a second LED light source 46b adjacent to the first LED light source 46a; and the third light source module 48 comprises a first LED light source 48a and a second LED light source 48b adjacent to the first LED light source 48a.

Each of the light source modules respectively emits a first color light, a second color light and a third color light. More specifically, the first and the second LED light sources 41a, 41b of the first light source module 41 emit the first color light; the first and the second LED light sources 46a, 46b of the second light source module 46 emit the second color light; and the first and the second LED light sources 48a, 48b of the third light source module 48 emit the third color light. In this embodiment, the first color light, the second color light and the third color light can be a red light, a green light and a blue light respectively, although the present invention is not merely limited thereto.

Each of the first LED light sources 41a, 46a, 48a provides a first light beam according to the first time sequence; and each of the second LED light sources 41b, 46b, 48b provides a second light beam according to the second time sequence. Hence, three first light beams are generated by the light source modules 41, 46, 48 according to the first time sequence in turn, and three second light beams are generated by the light source modules 41, 46, 48 according to the second time sequence in turn. It shall be appreciated that for the purpose of the clarity of the drawings and simplicity of the description, only the light paths of the first and the second light beams of the first light source module 41 are depicted, with those of the light beams of the second light source module 46 and the third light source module 48 being omitted; however, those light paths will be readily known by those skilled in the art.

In this example, an X-cube is used as the color combining element 42 for combining the red light, the green light and the blue light. In other examples, the color combining element may also be an X-plate, a diachronic Mirror or the like, and the present invention is not merely limited to what is described above.

After being combined, the first light beams and the second light beams of three colors pass through the first lens array set 43 and the second lens array set 44, and are guided into the spatial light modulator 45. The first light beams are transformed into a first view angle image and the second light beams are transformed into a second view angle image by the spatial light modulator 45 according to the time sequence. Then, the lens 47 projects the first view angle image and the second view angle image onto the display screen 31. In this example, the spatial light modulator 45 can be a digital micromirror device (DMD); however, in other applications, a liquid crystal display (LCD) device may also be used.

Figure 5:
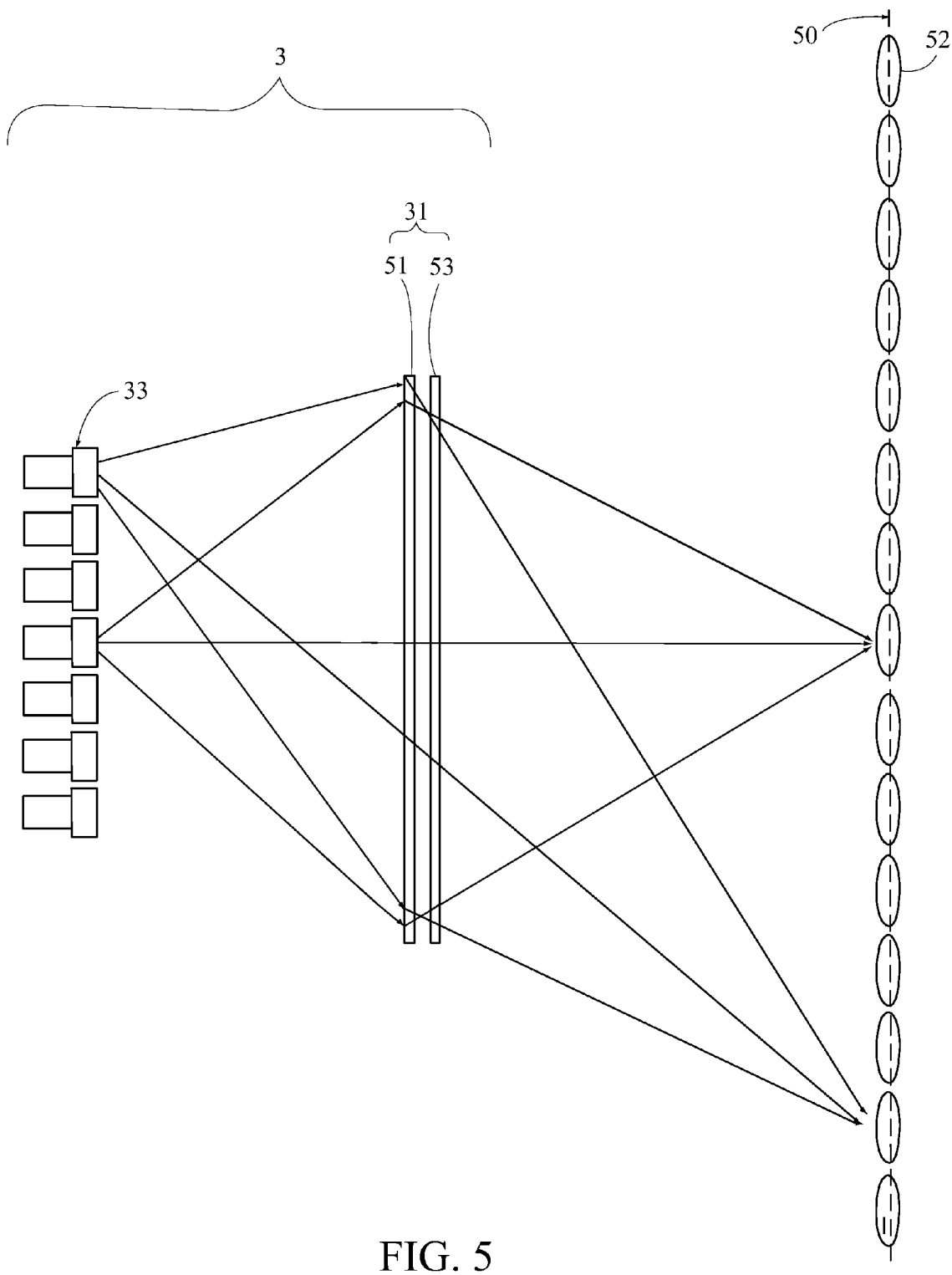
FIG. 5 is a partial top view of the display apparatus in which Fresnel lens is used as the screen according to the first embodiment of the present invention.

FIG. 5 shows the first embodiment of the present invention and illustrates a partial top view of the display apparatus 3 in which the screen of fresnel lens type are used. In the display apparatus 3, the projectors 33 are arranged in an array. The projectors 33 arranged in the lower row of the array are omitted from depiction herein for convenience of description.

As shown, the display screen 31 comprises a Fresnel lens 51 and a vertical diffuser 53. The Fresnel lens 51 focuses the light beams from the projectors 33 onto a plane; and the vertical diffuser 53 diffuses the first light beams and the second light beams along the vertical direction to enlarge and extend the vertical viewing zone and mitigate non-uniformity of the light beams. The images projected by each of the projectors 33 are guided onto the corresponding viewing zone 52 via the display screen 31; in other words, fifteen viewing zones 52 will be generated by the fifteen projectors 33 in this embodiment, and all the viewing zones 52 are located within an identical reference plane 50.

Figure 6:
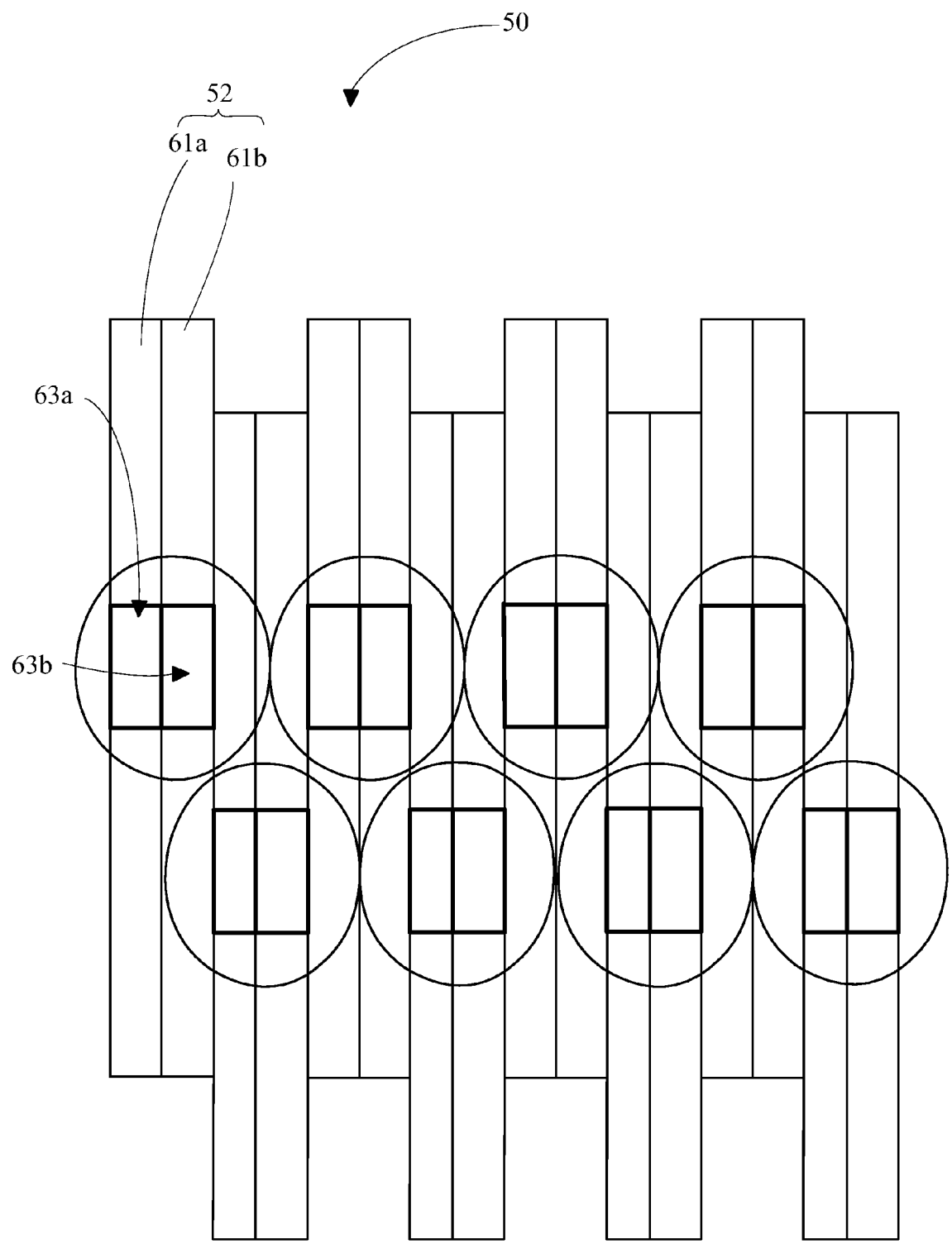
FIG. 6 is a schematic view illustrating the light distribution of the viewing angle image formed by the light source module shown in FIG. 4.

To present the imaging status of the viewing zones more clearly, FIG. 6 depicts the image distribution of the viewing zones 52 on the reference plane 50. Here, one projector and a corresponding viewing zone 52 will be taken as an example for description. The light from first view angle image 63a and the light from second view angle image 63b from the projector are respectively guided to the first and second sub-viewing zones of 61a and 61b by the display screen 31. The vertical diffuser 53 diffuses the first light beams and the second light beams along the vertical direction to enlarge and extend the vertical angle images and forms the first view angle image 63a and second view angle image 63b. The view angle images generated by all the projectors are adjacent to each other along the horizontal axis sequentially, and the view angle images belonging to different sub-viewing zones form the displaying images with superior stereoscopic resolution. In short, the view angle images presented in the individual sub-viewing zones of the viewing zones are different from each other, so that the left and the right eyes of the user perceive two different view angle images as the two eyes respectively correspond to two adjacent sub-viewing zones. Thus, a stereoscopic image performance can be demonstrated. It shall be mentioned that the display screen 31 can include other optical components with stereoscopic displaying functions for manipulating the viewing zones according to practical demands, and the present invention is not limited to what is described above.

In this embodiment, a plurality of LED light sources are turned on and off sequentially to produce a time multiplex effect to generate a stereoscopic displaying effect of time multiplex by rapidly switching time sequences. Furthermore, a spatial multiplex effect can be further achieved by using a number of projectors arranged in an array to improve the flexibility in the view angle division.

Figure 7:
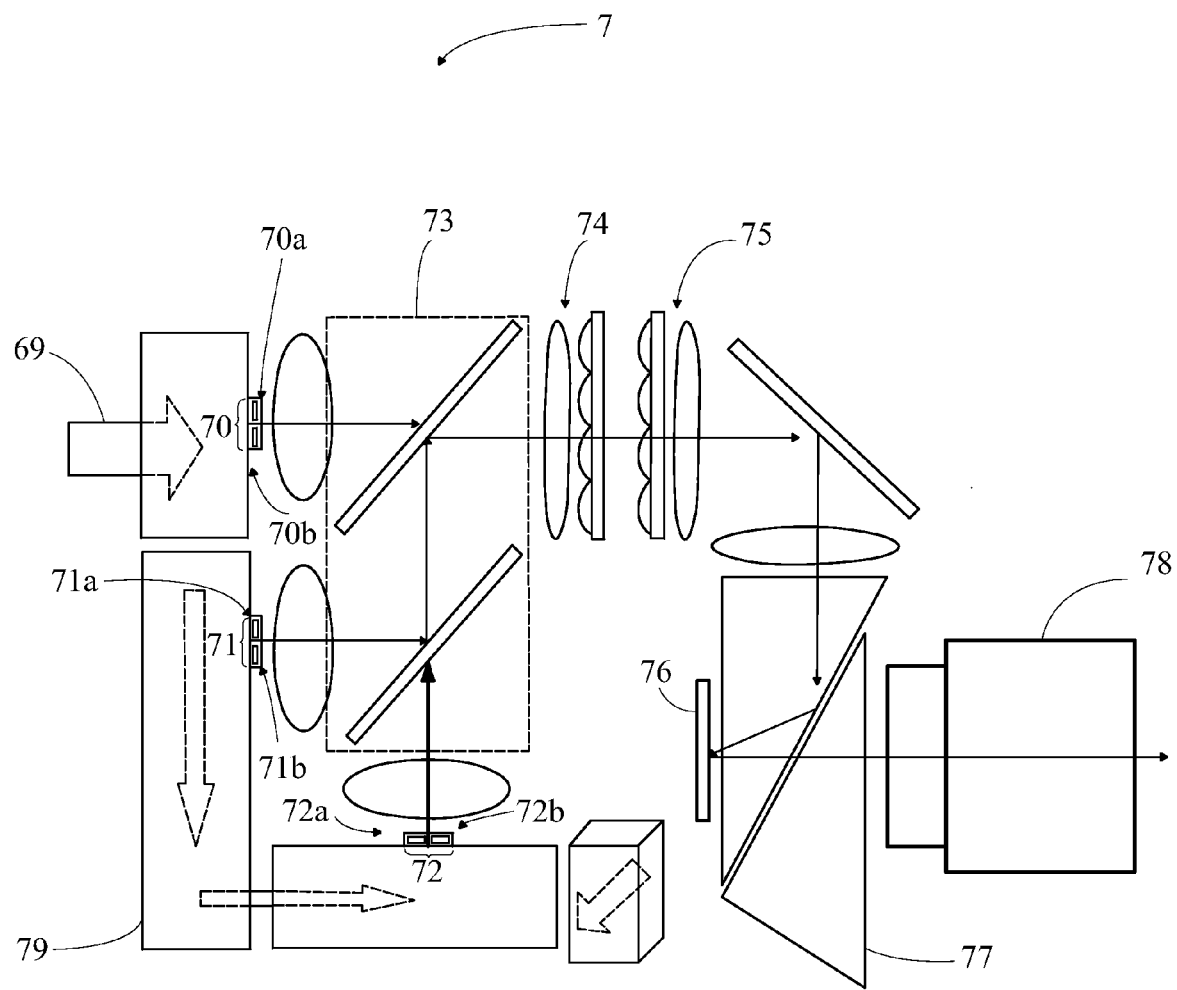
FIG. 7 is a schematic view illustrating internal components of the projector of the present invention.

FIG. 7 is a schematic view illustrating the internal components in the projector of the present invention. The projector 7 comprises three light source modules, a beam splitter set 73, a first lens array set 74, a second lens array set 75, a spatial light modulator 76, a total internal reflection (TIR) prism 77, a lens 78 and a heat dissipation module 79.

As shown in the projector 7 of this example, the three light source modules include a first light source module 70, a second light source module 71 and a third light source module 72. The first light source module 70 comprises a first LED light source 70a and a second LED light source 70b adjacent to the first LED light source 70a; the second light source module 71 comprises a first LED light source 71a and a second LED light source 71b adjacent to the first LED light source 71a; and the third light source module 72 comprises a first LED light source 72a and a second LED light source 72b adjacent to the first LED light source 72a. Herein, the first and the second LED light sources 70a, 70b of the first light source module 70, the first and the second LED light sources 71a, 71b of the second light source 71 and the first and the second LED light sources 72a, 72b of the third light source modules 72 are respectively for emitting the first color light, second color light and third color light. In this example, the first color light is a red light, the second color light is a green light, and the third color light is a blue light, although they are not limited thereto. In this example, the red light, the green light and the blue light emitted by the LED light sources are combined by the beam splitter set 73, and then passing through the first lens array set 74, the second lens array set 75, the spatial light modulator 76 and the TIR prism 77. Finally, the image is projected outwards by the lens 78.

In this example, a heat dissipation module 79 is further provided. The heat dissipation module 79, which adjoins the light source modules 70, 71, 72 via a heat dissipation plate (not shown), dissipates heat around the LED light sources 70a, 70b, 71a, 71b, 72a and 72b by a cooling air flow 69.

Figure 8:
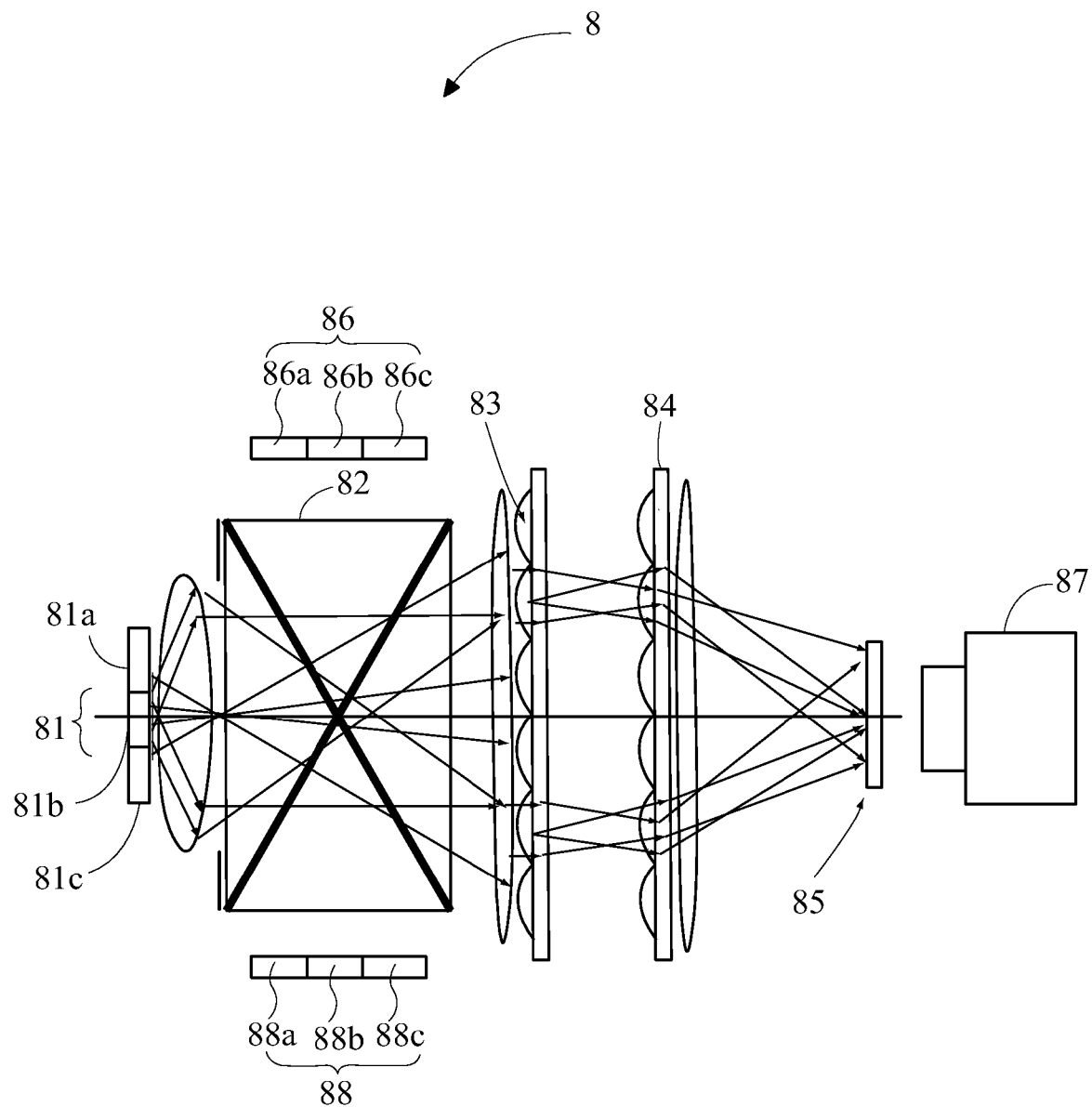
FIG. 8 is a schematic view illustrating the structure of 3-LED light source module.
Figure 9:
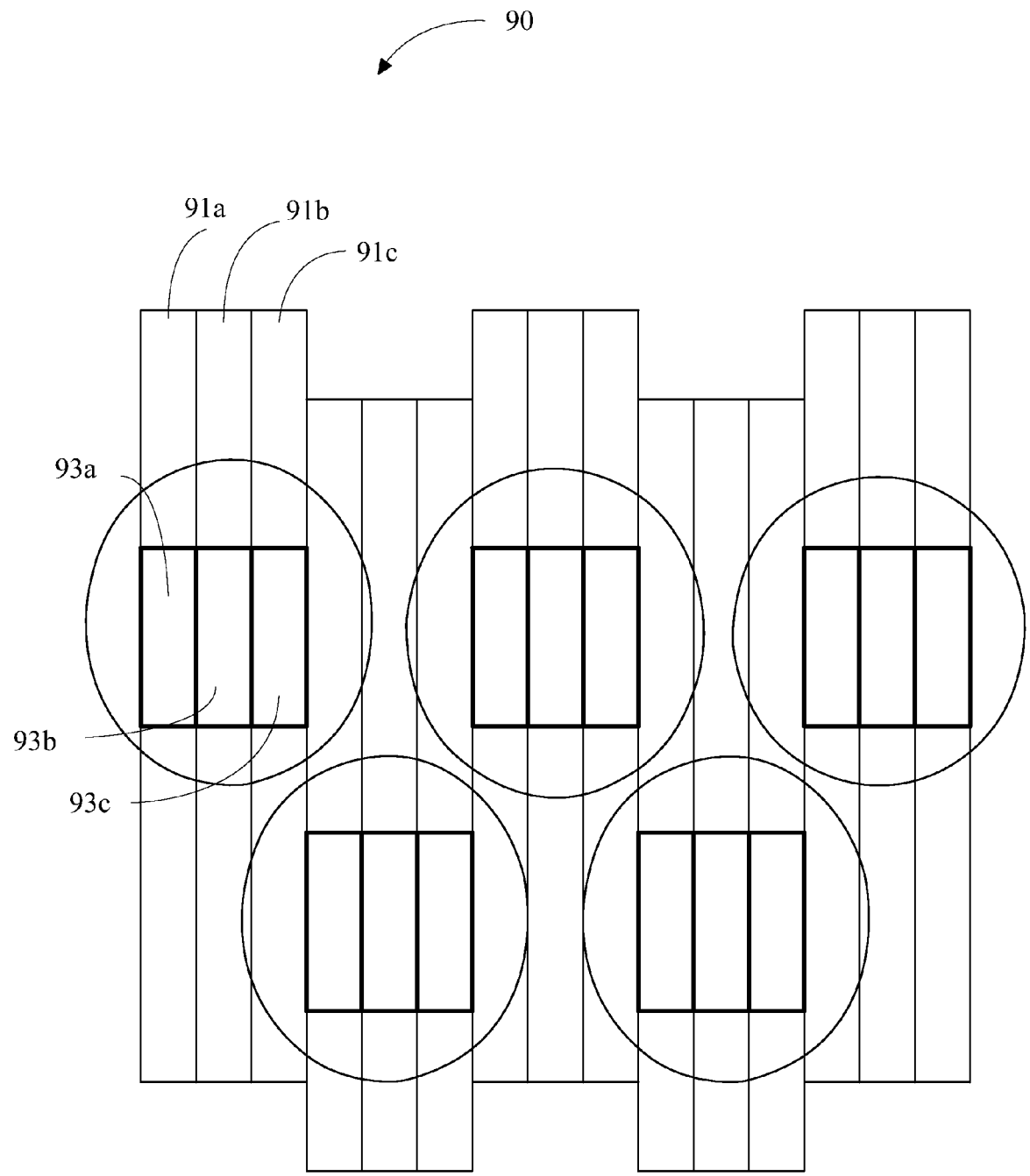
FIG. 9 is a schematic view illustrating the light distribution of the viewing angle images formed by the light source module shown in FIG. 8.

FIG. 8 is a schematic view illustrating the internal components in yet another example of the present invention, while FIG. 9 is a schematic view illustrating the light distribution of the sub-viewing zones that are formed by imaging the exit pupils of the lenses and diffusing the imaged light in the vertical direction. As shown in FIG. 8, the projector 8 of this example also comprises three light source modules 81, 86, 88, a light combining element 82, a first lens array set 83, a second lens array set 84, a spatial light modulator 85 and a lens 87. However, as can be known by the comparison between FIGS. 8 and 4, the difference between the light module 8 of this example and the light module 33 of the first embodiment is that each of the light source modules 81, 86, 88 of the projector 8 of this example has three LED light sources. In more detail, the first light source module 81 comprises a first, a second and a third LED light source 81a, 81b, 81c adjacent to each other; the second light source module 86 comprises a first, a second and a third LED light source 86a, 86b, 86c adjacent to each other; and the third light source module 88 comprises a first, a second and a third LED light source 88a, 88b, 88c adjacent to each other.

The light source modules respectively emit a first color light, a second color light and a third color light. More specifically, the first, the second and the third LED light sources 81a, 81b, 81c of the first light source module 81 are for emitting the first color light. The first, the second and the third LED light sources 86a, 86b, 86c of the second light source module 86 are for emitting the second color light. The first, the second and the third LED light sources 88a, 88b, 88c of the third light source module 88 are for emitting the third color light.

In this embodiment, the first color light, the second color light and the third color light are a red light, a green light and a blue light respectively, although the present invention is not merely limited thereto.

Each of the first LED light sources 81a, 86a, 88a provides a first light beam according to the first time sequence; each of the second LED light sources 81b, 86b, 88b provides a second light beam according to the second time sequence; and each of the third LED light sources 81c, 86c, 88c provides a third light beam according to the third time sequence. Accordingly, the three first light beams are generated by the light sources 81a, 86a, 88a in turn according to the first time sequence, the three second light beams are generated by the light sources 81b, 86b, 88b in turn according to the second time sequence, and the three third light beams are generated by the light sources 81c, 86c, 88c in turn according to the third time sequence. It shall be mentioned that that light paths of the second light source module 86 and the third light source module 88 are omitted herein, and only the light paths of the first, second and third light beams of the first light source module 81 are depicted for the purpose of clarity of the drawings and simplicity of the description; however, those light paths will be readily known by those skilled in the art.

The elements and associated operational mechanisms that are the same as what is described above will not be further described herein. It shall be mentioned that the amount of LED light sources of the light source modules may be increased for forming more corresponding sub-viewing zones according to the above examples of the projector of the present invention.

As shown in FIG. 9, the light source of the third view angle image is imaged onto a third sub-viewing zone 91c and further diffused and extended into sub-viewing zone 91c via a display screen (not shown). The first view angle image 93a and the second view angle image 93b are also formed and diffused into the sub-viewing zones 91a and 91b in the same way. The first sub-viewing zones 91a, the second sub-viewing zones 91b and the third sub-viewing zones 91c are formed on a reference plane 90.

Figure 10:
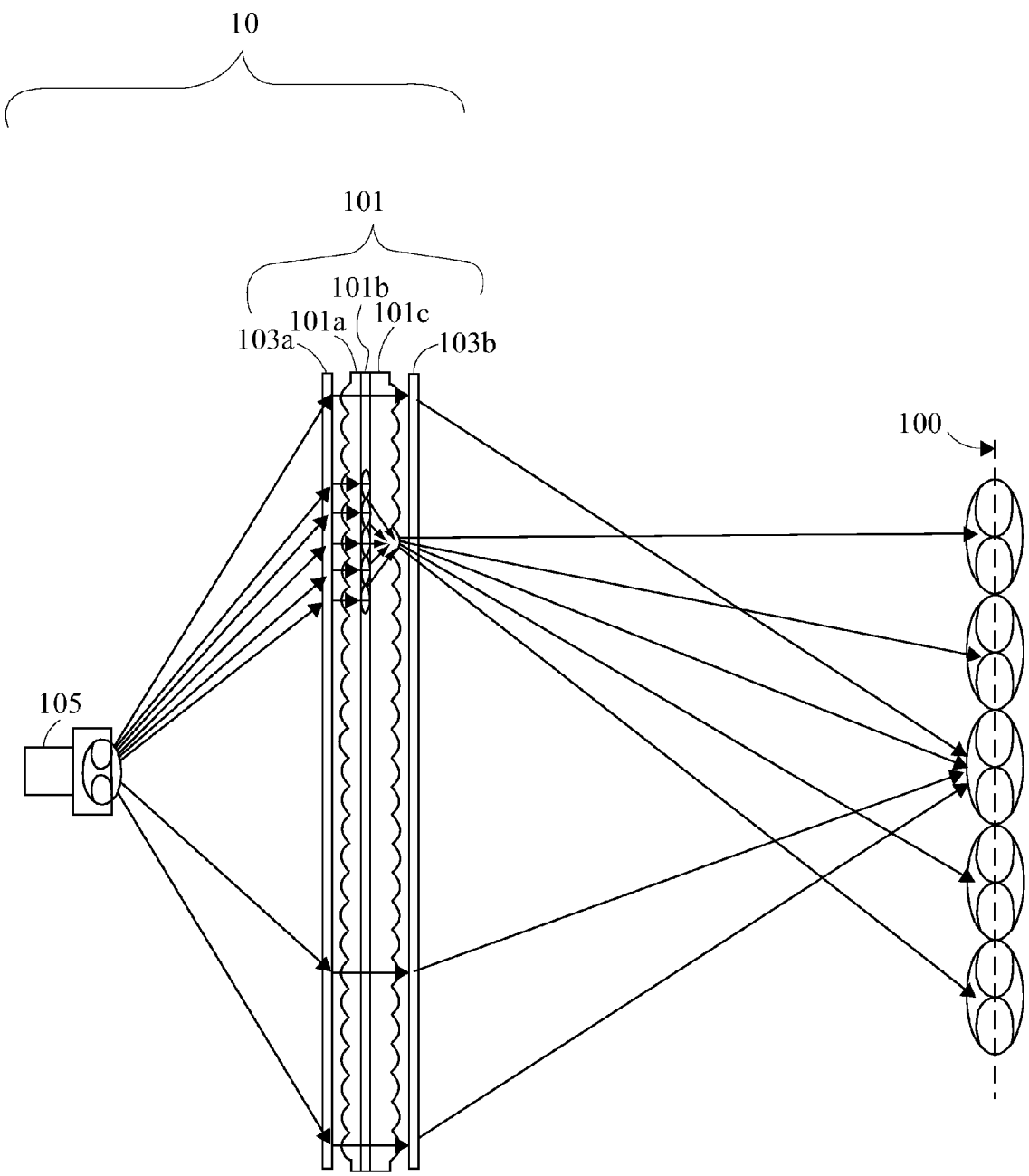
FIG. 10 is a partial top view of a display apparatus in which the double lenticular lens sheets are used as the screen according to the second embodiment of the present invention.

The second embodiment of the present invention is shown in FIG. 10. The difference between the second embodiment and the first embodiment is that the display screen 101 of the display apparatus 10 comprises two back-to back lenticular lens sheets (also named as "double lenticular lens sheets"), which has two lenticular lens sheets 101a, 101c and an all-directions diffuser 101b sandwiched between the two lenticular lens sheets 101a, 101c. The first Fresnel plate 103a and a second Fresnel plate 103b can be disposed on the outsides of the two lenticular lens sheets 101a, 101c when in the case of short throw distance or short observing distance.

According to the above descriptions, with the aforesaid particular combination of the projector array and the display screen, the display apparatus of the present invention is essentially an auto-stereoscopic display that formed by LED based projector array. The display apparatus can combine the advantages of the spatial multiplex method and the time multiplex method to achieve the auto-stereoscopic function of displaying multiple view angle images. Furthermore, the used LED light sources can not only significantly decrease the volume and power consumption of the projectors, but also improve the resolution, service life and stability of the projectors. Thus, the problem with the prior art is effectively solved. With the display apparatus of the present invention, a stereoscopic image with preferable resolution can be presented to the user.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A display apparatus for displaying multiple view angle images, comprising:
   a display screen, comprising two back-to back lenticular lens sheets, a diffuser layer and two Fresnel plates, in which the diffuser layer is disposed between the two back-to back lenticular sheets which are sandwiched between the two Fresnel plates; and
   a plurality of projectors, each of the projectors comprising:
      three light source modules, each of the light source modules comprising:
         a first light emitting diode (LED) light source, providing a first light beam according to a first time sequence and a second LED light source, being adjacent to the first LED light source and providing a second light beam according to a second time sequence;
         a color combining element, combining the first light beam and the second light beam;
         a spatial light modulator, transforming the first light beam and the second light beam into a first view angle image and a second view angle image respectively after the color combining element combining the first light beam and the second light beam; and
      a lens, projecting the first and second view angle images to the display screen;
   wherein each of the three light source modules and the spatial light modulator is disposed corresponding to each side of the color combining element,
   wherein the three light source modules include two or more sets of RGB light sources, each of the sets of RGB light sources is to emit a red light, a green color light and blue light to the spatial light modulator to create one of the first view angle image and the second view angle image, the first view angle image and the second view angle image projected from each of the projectors are guided to a first sub-viewing zone and a second sub-viewing zone of a respective viewing zone by the display screen respectively, and the sub-viewing zones imaged by each of the projectors are adjacent to each other along a horizontal axis sequentially.

2. The display apparatus of claim 1, wherein each of the first sub-viewing zones and each of the second sub-viewing zones are formed on a reference plane.

3. The display apparatus of claim 1, wherein each of the three light source modules further comprises a third LED light source adjacent to the second LED light source, the third LED light source emits a third light beam according to a third time sequence, the spatial light modulator transforms the third light beam into a third view angle image, the lens projects the third view angle image to the display screen, and light from the third view angle image is guided to a third sub-viewing zone by the display screen via the third light beam.

4. The display apparatus of claim 3, wherein each of the first sub-viewing zones, each of the second sub-viewing zones and each of the third sub-viewing zones are formed on a reference plane.

5. The display apparatus of claim 1, wherein the first color light is red, the second color light is green, and the third color light is blue.

6. The display apparatus of claim 1, wherein the spatial light modulator is a digital micro-minor device (DMD) or a liquid crystal display device (LCD device).

7. A display apparatus for displaying multiple view angle images, comprising:
   a display screen, comprising two back-to back lenticular lens sheets, a diffuser layer and two Fresnel plates, in which the diffuser layer is disposed between the two back-to back lenticular sheets which are sandwiched between the two Fresnel plates;
   a plurality of projectors, each of the projectors comprising:
      three light source modules, each of the light source modules, comprising a first light emitting diode (LED) light source providing a first light beam according to a first time sequence and a second LED light source being adjacent to the first LED light source and providing a second light beam according to a second time sequence;
      a spatial light modulator, transforming the first light beam and the second light beam into a first view angle image and a second view angle image respectively; and
      a lens, projecting the first and second view angle images to the display screen;
   wherein the three light source modules include two or more sets of RGB light sources, each of the sets of RGB light sources is to emit a red light, a green color light and a blue light to the spatial light modulator to create one of the first view angle image and the second view angle image, the first view angle image and light from the second view angle image projected from each of the projectors are guided to a first sub-viewing zone and a second sub-viewing zone of a respective viewing zone by the display screen respectively, and the sub-viewing zones imaged by each of the projectors are adjacent to each other along a horizontal axis sequentially.

8. A display apparatus for displaying multiple view angle images, comprising:

a display screen; and a plurality of projectors, each of the projectors comprising:

three light source modules, each of the light source modules comprising a first light emitting diode (LED) light source providing a first light beam according to a first time sequence and a second LED light source being adjacent to the first LED light source and providing a second light beam according to a second time sequence;

a spatial light modulator, transforming the first light beam and the second light beam into a first view angle image and a second view angle image respectively; and a lens, projecting the first and second view angle images to the display screen;

wherein the three light source modules include two or more sets of RGB light sources, each of the sets of RGB light sources is to emit a red light, a green color light and a blue light to the spatial light modulator to create one of the first view angle image and the second view angle image, the first view angle image and light from the second view angle image projected from each of the projectors are guided to a first sub-viewing zone and a second sub-viewing zone of a respective viewing zone by the display screen respectively, and the sub-viewing zones imaged by each of the projectors are adjacent to each other along a horizontal axis sequentially.

* * * * *